(12) United States Patent
Dong

(10) Patent No.: US 8,320,065 B2
(45) Date of Patent: Nov. 27, 2012

(54) LENS DRIVING DEVICE

(75) Inventor: Le-Ping Dong, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 110 days.

(21) Appl. No.: 13/016,023

(22) Filed: Jan. 28, 2011

(65) Prior Publication Data

US 2012/0075730 A1    Mar. 29, 2012

(30) Foreign Application Priority Data

Sep. 23, 2010  (CN) .......................... 2010 1 0289373

(51) Int. Cl.
*G02B 7/02*  (2006.01)
(52) U.S. Cl. ........................................ 359/824; 359/819
(58) Field of Classification Search .......... 359/694–704, 359/811–824
See application file for complete search history.

(56) References Cited

U.S. PATENT DOCUMENTS

| | | | | |
|---|---|---|---|---|
| 5,657,172 | A | * | 8/1997 | Shibata et al. ................. 359/824 |
| 6,134,058 | A | * | 10/2000 | Mohri et al. ................... 359/824 |
| 2010/0097712 | A1 | * | 4/2010 | Miura et al. ................... 359/824 |

* cited by examiner

*Primary Examiner* — Mohammed Hasan
(74) *Attorney, Agent, or Firm* — IPro, Inc.; Na Xu

(57) ABSTRACT

An lens driving device is disclosed. The lens driving device includes a base, a lens holder mounted on the base, a movable cover opposite to the a lens holder, a elastic supporting portion received into the lens holder and engaged with the movable cover, a coil and a permanent magnet respectively attached on the lens holder. The permanent magnet interacts with the coil for generating a magnetic force for driving the lens holder to move toward the base along a central axis of the lens holder. The elastic supporting portion defines an elastic force which is more than a weight of the movable cover but not more than the resultant of the weight of the movable cover and the magnetic force. While assembled, the lens driving device further defines a movable distance between an upper surface of the supporting elements and a first surface of the movable cover.

13 Claims, 4 Drawing Sheets

LENS DRIVING DEVICE

FIELD OF THE INVENTION

The present invention relates to a lens driving device, and particularly to a lens driving device having a cylindrical elastic supporting portion.

DESCRIPTION OF RELATED ART

Referring to FIG. 1, a lens driving device 100' related to the present invention includes a holder 6' having a receiving space 61', a pair of plate springs 3' mounted on the holder, a lens element 1' suspended in the receiving space 61' by the plate springs 3', and a coil 4' and a permanent magnet 5' attached on the holder 6', respectively. The permanent magnet 5' interacts with the coil 4' to generate a magnetic force for driving the lens element 1' to move along an axis of the lens element V. Each plate spring 3 defines a inner portion 31', a outer portion 32' surrounding the inner portion 31', and a plurality of connecting portions 33' disposed between and connecting the inner and outer portions 31', 32'.

However, It is difficult to ensure the planeness of the connecting portions 33'. Thus, the lens element may moves along a direction perpendicular to the axis of the lens element and an offset is defined between a moving direction of the lens element and the central of the lens element. Furthermore, the anti-torsion strength of the plat spring is poor and the performance of the lens driving device is undesirable.

So, it is necessary to provide a new lens driving device for solving the problem mentioned above.

DETAILED DESCRIPTION OF THE EMBODIMENTS

Reference will now be made to describe the exemplary embodiments of the present invention in detail.

Figure 1:
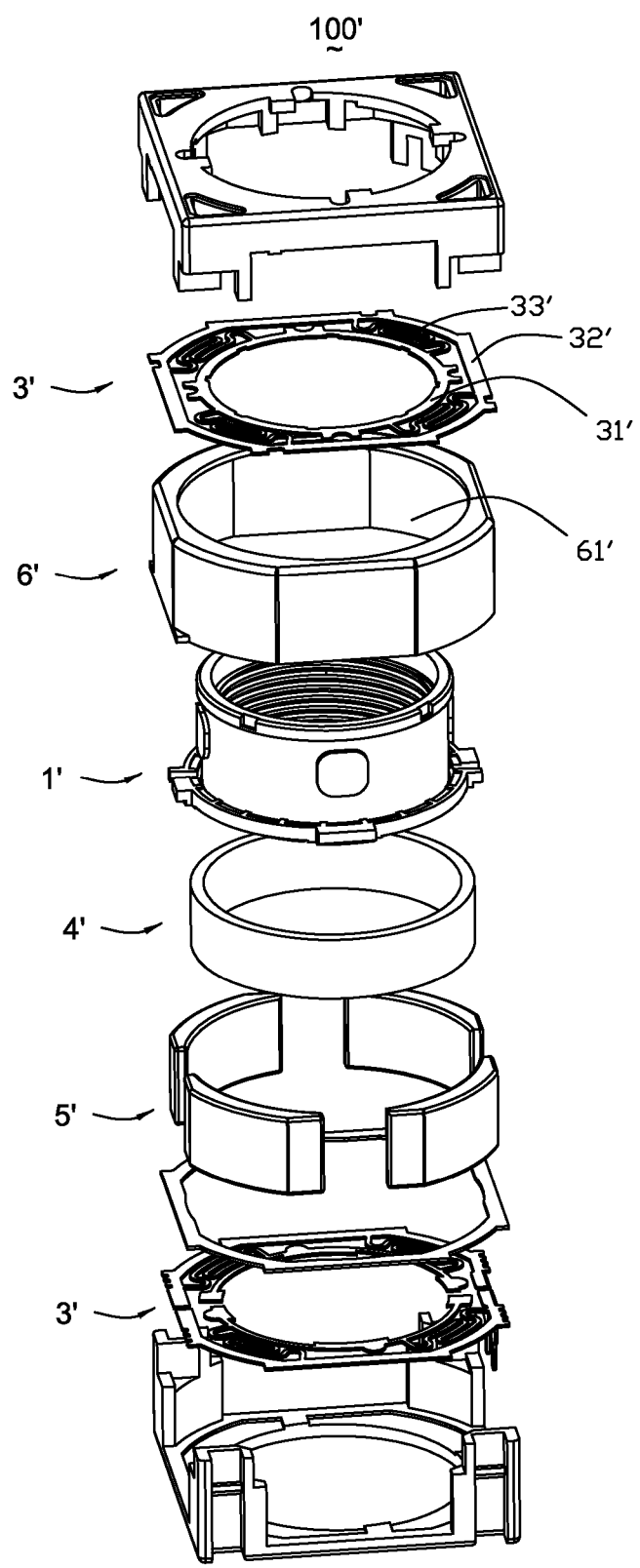
FIG. 1 is an exploded view of a lens driving device related to the present invention.
Figure 2:
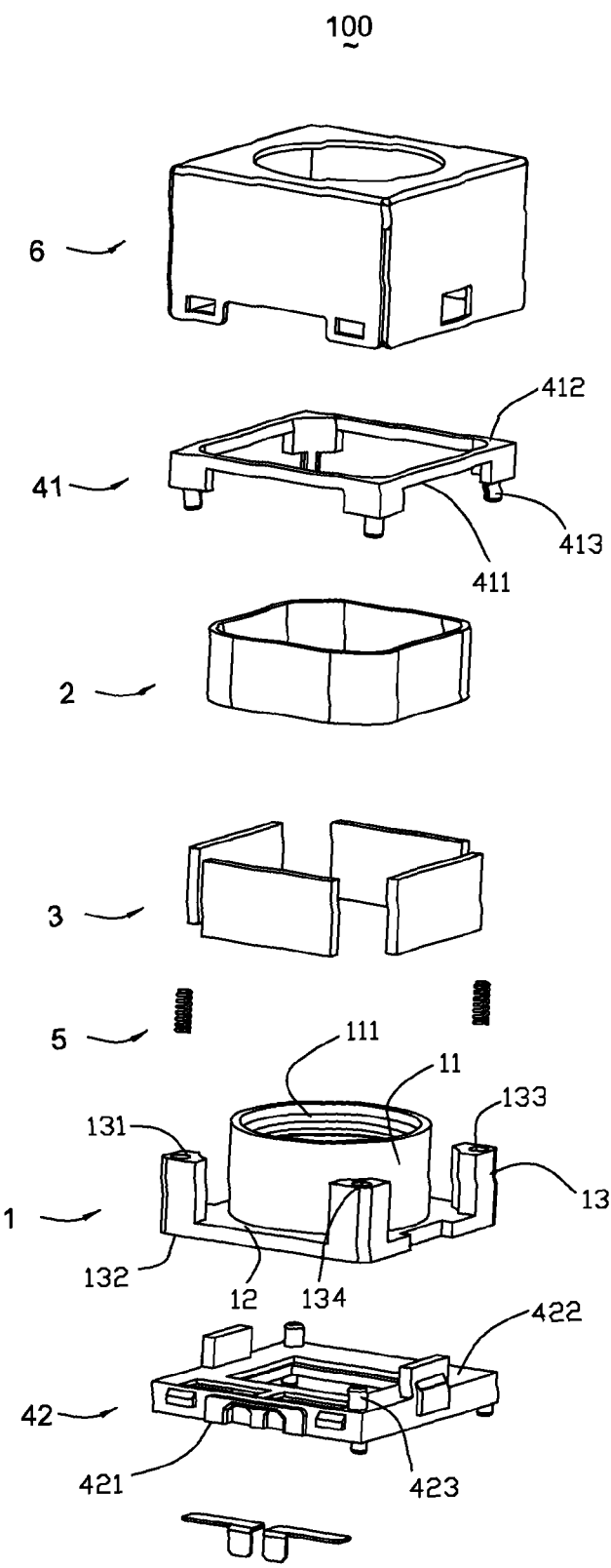
FIG. 2 is an exploded view of a lens driving device according to a first exemplary embodiment of the present invention.
Figure 3:
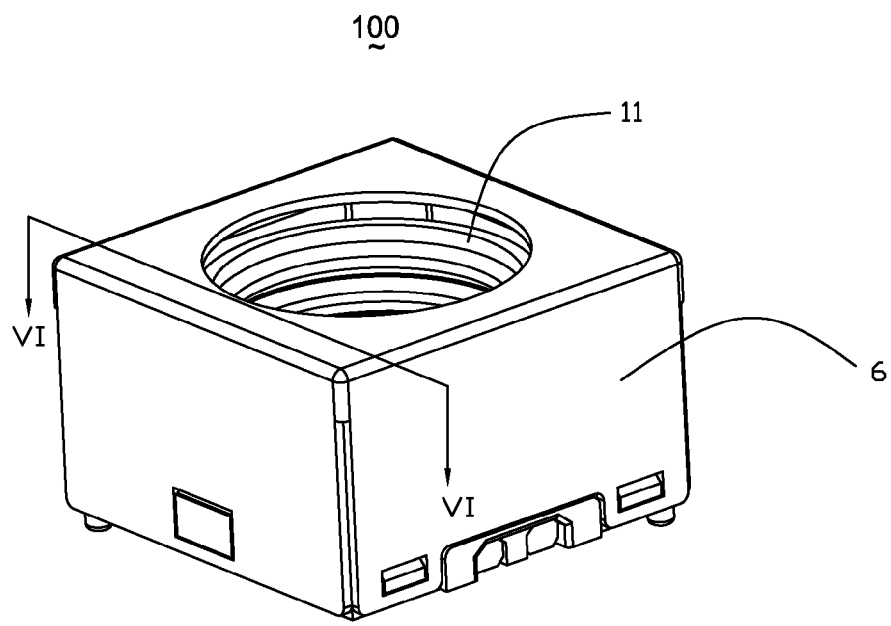
FIG. 3 is an illustrative assembled view of the lens driving device in FIG. 2.
Figure 4:
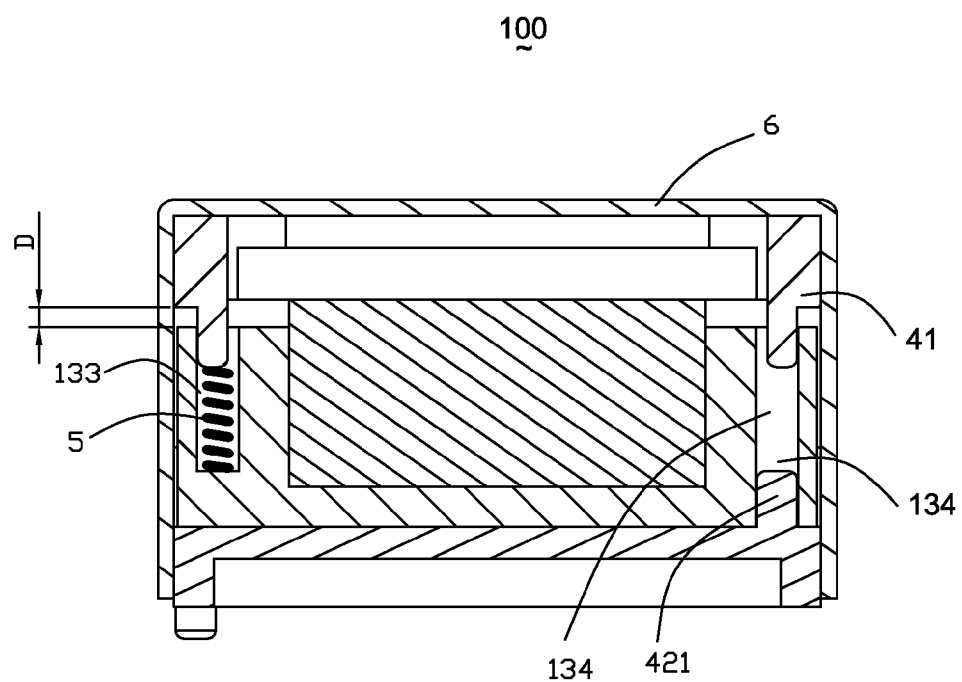
FIG. 4 is an illustrative cross-sectional view of the lens driving device of FIG. 2, taken along line VI-VI thereof.

Referring to FIG. 2, a lens driving device 100 comprises a base 42, a lens holder 1 mounted on the base 42, a movable cover 41 opposite to the a lens holder 1, a pair of elastic supporting portions 5 received into the lens holder 4 and engaged with the movable cover 41, a coil 2 and a permanent magnet 3 respectively attached on the lens holder 1 and a case 6 mounted on the base 42. The permanent magnet 3 interacts with the coil 2 for generating a magnetic force for driving the lens holder 1 to move toward the base along a central axis of the lens holder 1. The elastic supporting portions 5 defines an elastic force which is more than a weight of the movable cover but not more than the resultant of the weight of the movable cover and the magnetic force.

The lens holder 1 defines a hollow core member 11, a connecting portion 12 extending from one end of the core member 11, and at least two supporting elements 13 extending upwardly from the connecting portion 12 and setting in space with respect to core member 11. The core member 11 defines a receiving hole 111 for receiving one or more lenses in a center thereof and the coil 2 wrapped therearound.

The movable cover 41 is generally rectangular shaped and defines a first surface 411, a second surface 412 opposite to the first surface 411, and four first guiding posts 413 extending from the second surface 412 away from the first surface 411 formed on four corners thereof An outer peripheral of the guiding post 413 is parallel to the central axis of the lens holder.

The supporting elements 13 defines an upper surface 131, a bottom surface 132 opposite to the upper surface 131 and a receiving hole 133 extending from the upper surface 131 towards the bottom surface 132 for receiving the first guiding post 413 and the elastic supporting portion 5. The lens driving device 100 of the present invention defines four supporting elements 13 which are symmetrical with respect to the central axis of the lens holder. The two adjacent supporting elements 13 have a same distance with one another.

The case 6, selected from permeability material, defines a top sheet 61 and a plurality of sidewalls 62 extending downwardly from the top sheet 61. The top sheet 61 defines a through hole 611 in a center thereof The base 42 defines a third surface 421, a fourth surface 422 opposite to the third surface 421 and engaged with the lens holder 1, and a plurality of second guiding posts 423 extending from the fourth surface 422 away from the third surface 421. The lens holder 1 further defines a plurality of engaging holes 134 extending from the bottom surface 132 of the lens holder 1 towards the upper surface 131 of the lens holder 1 for engaging with the second guiding posts 423. The lens driving device 100 of the present invention defines two the engaging holes 134 and a part of the receiving holes 133 are communicated with the engaging holes 134, respectively.

The elastic supporting portions 5, generally shaped as cylinder, is received in the receiving holes 133 and engaged with the first surface 411 of the movable cover 41.

The lens driving device 100 of the present invention defines four permanent magnets 3. Each permanent magnet 3 is mounted to two adjacent supporting elements 13.

While assembled, the lens driving device 100 further defines a movable distance D between an upper surface of the supporting elements 131 and a first surface of the movable cover 411. The lengths of the first and second guiding posts are more than the movable distance D.

Figure 5:
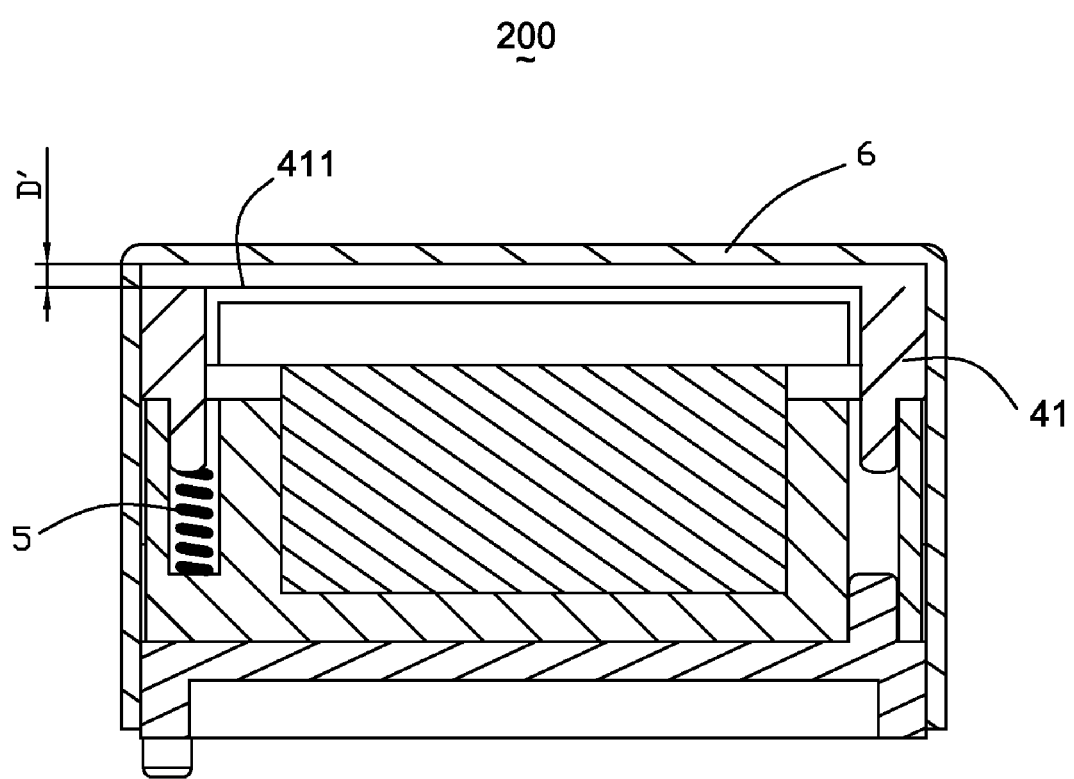
FIG. 5 is an illustrative cross-sectional view of the lens driving device according to a second exemplary embodiment of the present invention.

FIG. 5 illustrates a lens driving device 200 in accordance with a second embodiment of the present invention.

A weight of the movable cover 41 is more than the elastic force of the elastic supporting portions 5 but not more than the resultant of the elastic force of the elastic supporting portions 5 and the magnetic force. While assembled, the movable distance D' is defined between a second surface of the movable cover 411 and an inner surface of the top sheet 61.

In alternative embodiments, a part of the receiving holes of the supporting elements are drilled completely through the upper surface and a bottom surface for receiving the first and second guiding posts and another part of the receiving holes of the supporting element are not drilled through the bottom surface for receiving the first guiding posts and the elastic supporting portions.

The elastic supporting portion has a simple structure and can prevent the lens holder to move along the direction perpendicular to the central of the lens holder. However, the first and second guiding posts further ensure the movement of lens holder along the central of the lens holder. Thus, the performance of the lens driving device is desirable.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. An lens driving device, comprising:
   a base;
   a lens holder mounted on the base and defining a core member, a connecting portion extending from one end of the core member, and at least a pair of supporting elements extending upwardly from the connecting portion and setting in space with respect to core member;
   a movable cover opposite to the supporting elements;
   a elastic supporting portion received in the lens holder and engaged with the movable cover;
   a coil attached on the lens holder; and
   a permanent magnet attached on the lens holder and interacted with the coil for generating a magnetic force to drive the lens holder to move along a central axis of the core member;
   Wherein, the elastic supporting portion defines an elastic force which is more than a weight of the movable cover but not more than the resultant of the weight of the movable cover and the magnetic force;
   the lens driving device further defines a movable distance between an upper surface of the supporting elements and a first surface of the movable cover.

2. The lens driving device as described in claim 1, wherein each supporting element defines a receiving hole for receiving the elastic supporting portion.

3. The lens driving device as described in claim 2, wherein each elastic supporting portion is configured to be a cylinder.

4. The lens driving device as described in claim 3, wherein the supporting elements are symmetrical with respect to the central axis of the core member.

5. The lens driving device as described in claim 1, wherein the lens driving device defines more than two supporting elements and the distances of two adjacent supporting elements are same with one another.

6. The lens driving device as described in claim 1, wherein the movable cover defines a plurality of first guiding post received into the receiving holes and a length of the first guiding posts is more than the movable distance.

7. The lens driving device as described in claim 1, wherein the lens driving device further defines a case attached to the base and selected from permeability material.

8. The lens driving device as described in claim 7, wherein the coil is warped on the core member and the permanent magnet mounted to the adjacent supporting elements.

9. The lens driving device as described in claim 8, wherein the base defines a plurality of second guiding posts and the lens holder further defines a plurality of engaging holes for receiving the second guiding posts.

10. The lens driving device as described in claim 9, wherein a part of the receiving holes are communicated with the engaging holes, respectively.

11. A lens driving device, comprising:
    a base;
    a lens holder mounted on the base and defining a core member, a connecting portion extending from one end of the core member, and at least a pair of supporting elements extending upwardly from the connecting portion and setting in space with respect to core member;
    a movable cover opposite to the supporting elements;
    a coil wrapped around the core member;
    a permanent magnet attached on the lens holder and interacted with the coil for generating a magnetic force to drive the lens holder to move along a central axis of the core member; and
    a elastic supporting portion received in the lens holder and engaged with the movable cover;
    Wherein, the elastic supporting portion defines an elastic force;
    a weight of the movable cover is more than the elastic force of the elastic supporting portion but not more than the resultant of the elastic force and the magnetic force.

12. The lens driving device as described in claim 11, wherein the lens driving device further defines a case mounted on the base and defining a top sheet and a plurality of sidewalls extending downwardly from the top sheet and a movable distance between a second surface of the movable cover and an inner surface of the top sheet.

13. The lens driving device as described in claim 12, wherein each elastic supporting portion is configured to be a cylinder.

* * * * *